United States Patent
Melis et al.

(10) Patent No.: US 10,018,132 B2
(45) Date of Patent: Jul. 10, 2018

(54) METHOD OF OPERATING AN INTERNAL COMBUSTION ENGINE HAVING A TURBOCHARGER

(71) Applicant: GM GLOBAL TECHNOLOGY OPERATIONS LLC, Detroit, MI (US)

(72) Inventors: Massimiliano Melis, Rivoli (IT); Francesco Concetto Pesce, Turin (IT); Joaquin De La Morena, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/298,899

(22) Filed: Oct. 20, 2016

(65) Prior Publication Data

US 2017/0107923 A1 Apr. 20, 2017

(30) Foreign Application Priority Data

Oct. 20, 2015 (GB) .................................. 1518554.9

(51) Int. Cl.
| | |
|---|---|
| *F02M 26/02* | (2016.01) |
| *F02D 41/00* | (2006.01) |
| *F02M 26/47* | (2016.01) |
| *F02M 26/50* | (2016.01) |
| *F02M 26/17* | (2016.01) |

(Continued)

(52) U.S. Cl.
CPC .......... *F02D 41/0072* (2013.01); *F02B 37/12* (2013.01); *F02D 41/0007* (2013.01); *F02D 41/0052* (2013.01); *F02D 41/26* (2013.01); *F02M 26/17* (2016.02); *F02M 26/41* (2016.02); *F02M 26/47* (2016.02); *F02M 26/50* (2016.02); *F02D 41/18* (2013.01); *F02D 2200/04* (2013.01); *Y02T 10/144* (2013.01); *Y02T 10/47* (2013.01)

(58) Field of Classification Search
CPC ........ F02M 26/02; F02M 26/06; F02M 26/47; F02M 26/50; F02D 41/0007; F02D 2041/0017; F02D 2041/0067; F02D 2200/0406; F02D 2200/0408
USPC .......................... 701/108; 123/568.21, 568.22
See application file for complete search history.

(56) References Cited

U.S. PATENT DOCUMENTS

| | | | |
|---|---|---|---|
| 2004/0006978 A1* | 1/2004 | Beck .................. | F01N 3/021 60/289 |
| 2007/0079598 A1 | 4/2007 | Bailey et al. | |

(Continued)

FOREIGN PATENT DOCUMENTS

| | | |
|---|---|---|
| EP | 2474728 A1 | 7/2012 |
| JP | H01178760 A | 7/1989 |
| JP | 2012167638 A | 9/2012 |

OTHER PUBLICATIONS

Great Britain Patent Office, Great Britain Search Report for Great Britain Application No. 1518554.9, dated Apr. 6, 2016.

*Primary Examiner* — Erick Solis
(74) *Attorney, Agent, or Firm* — Lorenz & Kopf, LLP

(57) ABSTRACT

A method is disclosed for operating an internal combustion engine having a turbocharger and an exhaust gas recirculation pipe fluidly connecting an exhaust system to an air intake system upstream of a compressor of the turbocharger. A first value of a parameter indicative of the density of a mixture of fresh air and exhaust gas in the air intake system is determined. A flowing of exhaust gas through the exhaust gas recirculation pipe is interrupted if the first value is lower than a first reference value thereof.

15 Claims, 3 Drawing Sheets

(51) Int. Cl.
  *F02M 26/41* (2016.01)
  *F02B 37/12* (2006.01)
  *F02D 41/26* (2006.01)
  *F02D 41/18* (2006.01)

(56) References Cited

U.S. PATENT DOCUMENTS

| | | |
|---|---|---|
| 2008/0162018 A1* | 7/2008 | Dea ........................ F02M 26/46 701/108 |
| 2009/0076713 A1 | 3/2009 | Bailey et al. |
| 2012/0316753 A1 | 12/2012 | Rumpsa et al. |
| 2015/0128917 A1* | 5/2015 | Surnilla .............. F02D 41/0087 123/568.16 |
| 2016/0281652 A1 | 9/2016 | Takasu |
| 2016/0319779 A1* | 11/2016 | LaPointe ............. F02B 29/0443 |

* cited by examiner

METHOD OF OPERATING AN INTERNAL COMBUSTION ENGINE HAVING A TURBOCHARGER

CROSS-REFERENCE TO RELATED APPLICATION

This application claims priority to Great Britain Patent Application No. 1518554.9, filed Oct. 20, 2015, which is incorporated herein by reference in its entirety.

TECHNICAL FIELD

The present disclosure pertains to a method of operating an internal combustion engine having a turbocharger, for example a compression-ignition engine, for example a Diesel engine, having a turbocharger of a motor vehicle.

BACKGROUND

An internal combustion engine (ICE) generally includes an air intake system having an intake manifold and an air duct for conveying fresh air from the environment into the intake manifold, an exhaust system having an exhaust manifold for collecting the exhaust gasses and directing them to an exhaust pipe that conveys the exhaust gasses to the environment, and a turbocharger having a compressor located in the air intake system for compressing the air stream flowing therein and a turbine located in the exhaust system for driving the compressor.

In order to reduce the undesirable exhaust emission, some internal combustion engines, having a turbocharger, are provided with a long route exhaust gas recirculation (EGR) system, for selectively routing back exhaust gas from the exhaust system into the air duct of the air intake system. In such a way the exhaust gas mixed with the fresh air is aspired into the engine cylinders, in order to reduce the production of nitrogen oxides ($NO_x$) during the combustion process.

In details, long route EGR systems include an EGR pipe fluidly connecting the exhaust system downstream of an ICE particulate filter (DPF) with the air duct upstream of the compressor of the turbocharger, an EGR cooler located in the EGR pipe, and a valve for regulating the flow rate of exhaust gas through the EGR pipe.

A drawback of the long route EGR systems is due to potential water condensation in cold environmental condition. Indeed, during the engine warm up phase in cold environmental condition it happens that exhaust gas mixed with the fresh air condensates, generating water droplets which flow against the compressor wheels causing damages to the compressor of the turbocharger. Accordingly, it is desirable to prevent the condensation of the recirculated exhaust gas and thus protecting the compressor from the water droplets that can be generated that way.

SUMMARY

An embodiment of the present disclosure provides a method of operating an internal combustion engine having a turbocharger and an exhaust gas recirculation pipe fluidly connecting an exhaust system to an air intake system upstream of a compressor of the turbocharger. A first value of a parameter indicative of the density of a mixture of fresh air and exhaust gas in the air intake system is monitored, and a flowing of exhaust gas through the exhaust gas recirculation pipe is interrupted if the first value is lower than a first reference value thereof. As a matter of fact, the method according to this embodiment of the present disclosure provides a condensation control strategy which avoids water droplets, which can impact the compressor wheels of the turbocharger, in the air intake system downstream of the junction between the EGR pipe and the air intake system.

According to an aspect of this embodiment, a second value of the parameter indicative of the density of the mixture of fresh air and exhaust gas in the air intake system is monitored, and a flowing of exhaust gas through the exhaust gas recirculation pipe is interrupted if the second value is lower than a second reference value thereof. This aspect of the present disclosure provides a more reliable solution for determining a potential condensation in the induction gas, namely the mixture of fresh air and exhaust gas.

According to an aspect of this embodiment, monitoring the first value and the second value is provided by sampling over time pressure values of the mixture of fresh air and exhaust gas, performing a fast Fourier transform of the sampled pressure values and integrating the fast Fourier transform in a first and a second predetermined range of frequency. This aspect of the present disclosure provides a reliable solution for determining a potential condensation in the induction gas. Indeed the frequency spectrum of the pressure values of the induction gas in the air intake system upstream of the compressor changes as a function of the air density being the high frequency content proportional to the sound speed.

A different embodiment of the present disclosure provides an internal combustion engine having an exhaust gas recirculation pipe fluidly connecting an exhaust system to an air intake system upstream of a compressor of the turbocharger, and an electronic control unit configured to monitor a first value of a parameter indicative of the density of a mixture of fresh air and exhaust gas in the air intake system, and interrupt a flowing of exhaust gas through the exhaust gas recirculation pipe if the first value is lower than a first reference value thereof. This embodiment of the present disclosure provides a condensation control strategy which avoids water droplets, which can impact the compressor wheels of the turbocharger, in the air intake system downstream of the junction between the EGR pipe and the air intake system.

An aspect of this embodiment of the present disclosure provides that the electronic control unit is also configured to monitor a second value of the parameter indicative of the density of the mixture of fresh air and exhaust gas in the air intake system, interrupt a flowing of exhaust gas through the exhaust gas recirculation pipe if the second value is lower than a second reference value thereof. Also this aspect of the present disclosure provides a more reliable solution for determining a potential condensation in the induction gas.

An aspect of this embodiment of the present disclosure provides that the monitoring of the first value and the second value provides for the electronic control unit of sampling over time pressure values of the mixture of fresh air and exhaust gas, performing a fast Fourier transform of the sampled pressure values and integrating the fast Fourier transform in a first and a second predetermined range of frequency. This aspect of the present disclosure provides a reliable solution for determining the desired values of the parameter indicative of the density of the mixture of fresh air and exhaust gas.

The proposed solution may be also carried out in the form of a computer program product including a carrier and the computer program. The proposed solution may be also embodied as an electromagnetic signal modulated to carry a sequence of data bits which represent the computer program and/or as an electronic control unit for an air intake system of an internal combustion engine, wherein the electronic control unit is configured to execute the computer program.

Still another embodiment of the present disclosure provides an apparatus for operating an internal combustion engine having a turbocharger and an exhaust gas recirculation pipe fluidly connecting an exhaust system to an air intake system upstream of a compressor of the turbocharger. The apparatus is configured to monitor a first value of a parameter indicative of the density of a mixture of fresh air and exhaust gas in the air intake system, and interrupt a flowing of exhaust gas through the exhaust gas recirculation pipe, if the first value is lower than a first reference value thereof. This embodiment of the present disclosure basically achieves the same effects of method disclosed above, in particular it provides a condensation control strategy which avoids water droplets, which can impact the compressor wheels of the turbocharger, in the air intake system downstream of the junction between the EGR pipe and the air intake system.

According to an aspect of the embodiment, the apparatus may further be configured to monitor a second value of the parameter indicative of the density of the mixture of fresh air and exhaust gas in the air intake system, and interrupt a flowing of exhaust gas through the exhaust gas recirculation pipe if the second value is lower than a second reference value thereof. This aspect of the present disclosure provides a more reliable solution for determining a potential condensation in the induction gas.

According to an aspect of the apparatus, the apparatus may be configured to monitor the first value and the second value by sampling over time pressure values of the mixture of fresh air and exhaust gas, performing a fast Fourier transform of the sampled pressure values, and integrating the fast Fourier transform in a first and a second predetermined range of frequency.

This aspect of the present disclosure provides a reliable solution for determining the desired values of the parameter indicative of the density of the mixture of fresh air and exhaust gas.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
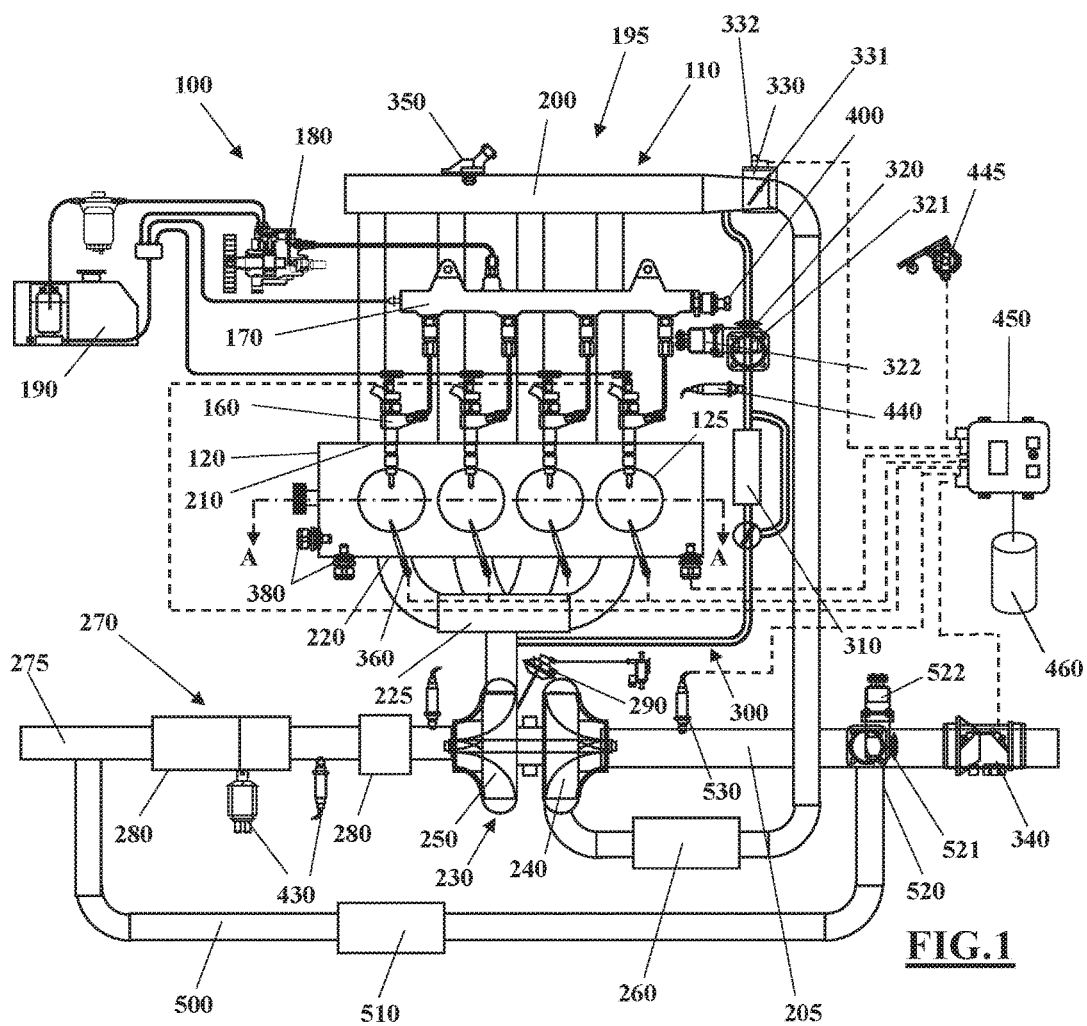
FIG. 1 schematically shows an automotive system.
Figure 2:
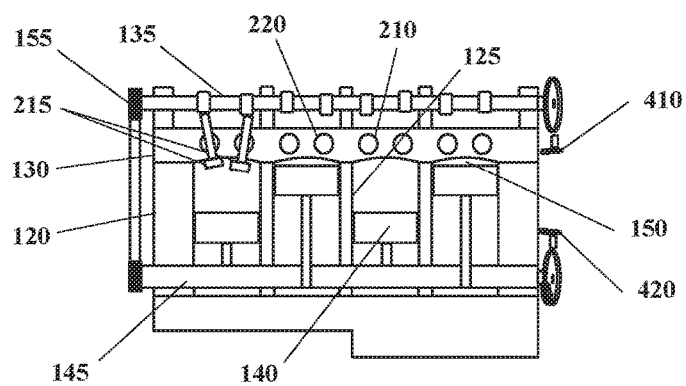
FIG. 2 is section A-A of FIG. 1.
Figure 3:
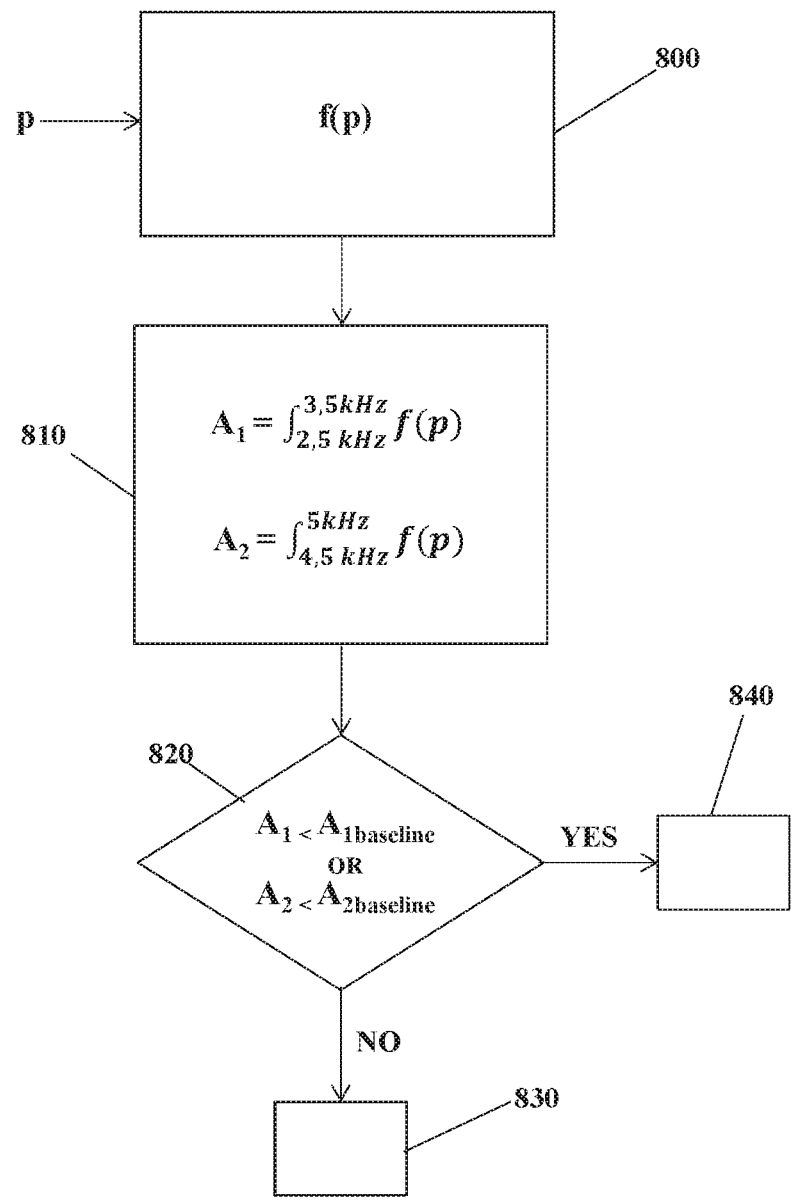
FIG. 3 is a flowchart representing in details a first example of an embodiment of a method of operating the automotive system of FIG. 1.
Figure 4:
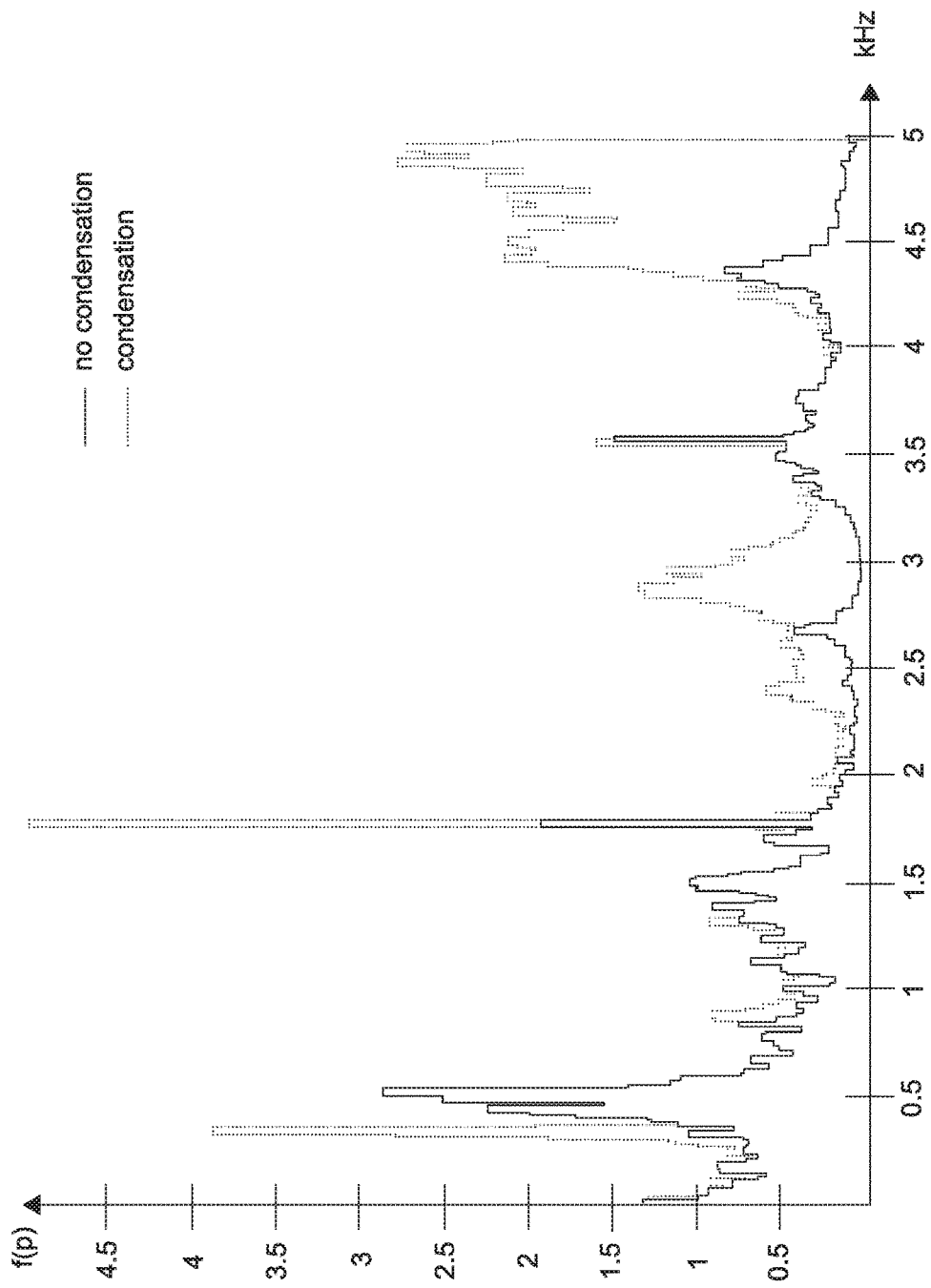
FIG. 4 is a graph of the fast Fourier transform of a parameter indicative of an air induction gas according to an embodiment of the method of operating the automotive system of FIG. 1.

Some embodiments may include an automotive system 100, as shown in FIGS. 1 and 2, that includes an internal combustion engine (ICE) 110, for example a compression-ignition engine (e.g. Diesel) or a spark-ignition engine (e.g. gasoline). The ICE 110 have an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through an exhaust port 220. In some examples, a cam phaser 155 may selectively vary the timing between the camshaft 135 and the crankshaft 145.

The exhaust gasses coming from the combustion chamber 150 are directed into an exhaust system 270. The exhaust system 270 may include an exhaust manifold 225 in fluid communication with the exhaust port(s) 220, which collects the exhaust gasses and directs them into and exhaust pipe 275 having one or more exhaust aftertreatment devices 280. The aftertreatment devices 280 may be any device configured to change the composition of the exhaust gases. Some examples of aftertreatment devices 280 include, but are not limited to, catalytic converters (two and three ways), oxidation catalysts, lean NOx traps, hydrocarbon adsorbers, selective catalytic reduction (SCR) systems, and particulate filters.

The air may be provided to the air intake port(s) 210 through an air intake system 195. The air intake system 195 may include an intake manifold 200 in communication with the air intake port(s) 210 and an air intake duct 205 providing air from the ambient environment to the intake manifold 200. An intake valve 330 may be disposed in the intake duct 205. The intake valve 330 may include a movable valve member 331, for example a throttle body, and an electrical actuator 332 that moves the valve member 331 to regulate the mass flow rate of the air directed into the manifold 200.

The air intake system 195 cooperates with a variable-geometry turbocharger 230, having a compressor 240 rotationally coupled to a turbine 250, wherein the compressor is located in the intake duct 205 and the turbine in the exhaust pipe 275. Rotation of the compressor 240 increases the pressure and temperature of the air in the intake duct 205 and manifold 200. An intercooler 260, disposed in the intake duct 205 between the compressor 240 and the intake manifold 200, may reduce the temperature of the air. The turbine 250 rotates by receiving exhaust gases from the exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes of the turbine 250 to alter the flow of the exhaust gases through it.

The ICE 110 may further be provided with an exhaust gas recirculation (EGR) system for recirculating part of the exhaust gasses back into the combustion chamber 150. The EGR system may include a short route, or high-pressure, EGR (HP-EGR) pipe 300 coupled between the exhaust manifold 225 and the intake manifold 200. More specifically, the HP-EGR pipe 300 branches from the exhaust manifold 225, or from a point of the exhaust pipe 275 located upstream of the turbine 250, and leads in a point of the intake duct 205 located downstream of the compressor 240, particularly between the intake manifold 200 and the intake valve 330. The HP-EGR pipe 300 may be provided with an HP-EGR cooler 310 to reduce the temperature of the exhaust gases flowing therein. An HP-EGR valve 320 may be disposed in the HP-EGR pipe 300. The HP-EGR valve 320 may include a movable valve member 321 and an electrical actuator 322 that moves the valve member 321 to regulate a mass flow rate of the exhaust gases in the HP-EGR pipe 300.

In some embodiments, the EGR system may further include a long route, or low-pressure, EGR pipe 500 coupled between the exhaust manifold 225 and the intake manifold 200. More specifically, the long route EGR pipe 500 branches from a point of the exhaust pipe 275 located downstream of the turbine 250, particularly downstream of the aftertreatment devices 280, and leads in a point of the intake duct 205 located upstream of the compressor 240. The EGR pipe 500 may be provided with a long route EGR cooler 510 to reduce the temperature of the exhaust gases flowing therein. A long route EGR valve 520 may be disposed in the long route EGR pipe 500. The long route EGR valve 520 may include a movable valve member 521 and an electrical actuator 522 that moves the valve member 521 to regulate a mass flow rate of the exhaust gases in the long route EGR pipe 500.

In the air intake duct 205, upstream of the compressor 240, is located a pressure sensor 530 for sensing a pressure value of a mixture of fresh air and exhaust gas inside the air intake system 195.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340 located in the intake duct 205 upstream of the long route EGR valve 520, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an HP-EGR temperature sensor 440, and an accelerator pedal position sensor 445. Furthermore, the ECU 450 may generate output signals to various control devices that are arranged to control the operation of the ICE 110, including, but not limited to, the fuel injectors 160, the intake valve actuator 332, the HP-EGR Valve actuator 322, the long route EGR valve actuator 522, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analogue and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible computer-readable storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an on-board computer, or any processing module that might be deployed in the vehicle.

The ECU 450 may be configured to perform a condensation detection strategy and to interrupt a flowing of exhaust gas through the EGR pipe 500 if a presence of water droplets is detected in the mixture of fresh air and exhaust gas supplied to the compressor 240.

In order to determine the presence of water droplets the ECU 450, for predetermined engine working points, monitors a parameter indicative of the density of the mixture of fresh air and exhaust gas supplied to the compressor 240. The density of the mixture of fresh air and exhaust gas, supplied to the compressor 240, can be detected by sampling over time, in predetermined engine working points, a pressure value of the mixture of fresh air and exhaust gas measured by the pressure sensor 530.

According to the present embodiment of the present disclosure the pressure sensor 530 is located in the air intake duct 205, however a different embodiment of the present disclosure provides that the pressure sensor 530 is located in the intake manifold 200. The frequency spectrum of the sampled pressure values changes as a function of the density of the mixture of fresh air and exhaust gas, because the high frequency content is proportional to the sound speed according to the following formula:

$$\text{sound speed} = \sqrt{\frac{\text{bulk}}{\text{density}}}$$

According to a preferred embodiment, the ECU 450 samples a plurality pressure values of the mixture of fresh air and exhaust gas, and performs a fast Fourier transform of the sampled pressure values (block 800) determining the frequency spectrum. Then the ECU 450 calculates (block 801) the integral of the fast Fourier transform of the sampled pressure values in a first predetermined range of frequencies, by means of the formula:

$$A_1 = \int_{a_1}^{a_2} F(p)$$

Wherein:

$a_1$ and $a_2$ are the end values of the first predetermined range of frequencies, and $F(p)$ is the fast Fourier transform of the sampled pressure values.

The end values $a_1$ and $a_2$ of the first predetermined range of frequencies are determined on the basis of the kind of the ICE 110 by means of experimental activity. According to the present embodiment of the present disclosure $a_1$ is equal to 2.5 kHz and $a_2$ is equal to 3.5 kHz.

The determined value $A_1$, which is a parameter indicative of the density of the mixture of fresh air and exhaust gas, is compared (block 820) with respective reference values $A_{1 baseline}$ determined by means of test performed during a calibration phase of the ICE 110. The reference value $A_{1 baseline}$ is determined in predetermined ICE working points wherein a condensation of the mixture of fresh air and exhaust gas is presumable. If the determined value $A_1$ is lower than the respective reference value $A_{1 baseline}$, then a potential condensation is detected by the ECU 450 which interrupts (block 840) the flowing of exhaust gas through the EGR pipe 500, avoiding compressor damages due to the presence of water droplets in the mixture of fresh air and exhaust gas. On the contrary, if the determined values $A_1$, indicative of the density of the mixture of fresh air and exhaust gas, is equal to or greater than the respective reference value $A_{1 baseline}$, then the ECU 450 allows the flowing of exhaust gas through the EGR pipe 500 (block 830).

According to a preferred embodiment the ECU 450 calculates also the integral of the fast Fourier transform of the sampled pressure values in a second predetermined range of frequencies, by means of the formula:

$$A_2 = \int_{a_3}^{a_4} F(p)$$

Wherein:

$a_3$ and $a_4$ are the end values of the second predetermined range of frequencies, and $F(p)$ is the fast Fourier transform of the sampled pressure values.

The end values $a_3$ and $a_4$ of the second predetermined range of frequencies are determined of the basis of the kind of the ICE by means of experimental activities. According to the present embodiment of the present disclosure $a_3$ is equal to 4.5 kHz and $a_4$ is equal to 5 kHz.

The determined values $A_2$ is compared (block 820) with a respective reference value $A_{2 baseline}$ determined by means of test performed dining a calibration phase of the ICE 110. The reference value $A_{2 baseline}$ is determined in predetermined ICE working points wherein a condensation of the mixture of fresh air and exhaust gas is not presumable.

Another embodiment of the present disclosure provides for a continuous update of the reference values $A_{1 baseline}$ and $A_{2 baseline}$ by a learning strategy, in which the frequency spectrum of the previously mentioned pressure signal is analyzed in conditions known not to cause condensation phenomena (i.e. warm engine coolant temperature and 20-30° C. ambient air temperature). If the determined values $A_1$ or $A_2$, indicative of the density of the mixture of fresh air and exhaust gas, are lower than the respective reference values $A_{1 baseline}$ and $A_{2 baseline}$, then a potential condensation is detected by the ECU 450, which interrupts the flowing of exhaust gas through the EGR pipe 500 of the long route EGR, avoiding compressor damages due to the presence of water droplets in the mixture of fresh air and exhaust gas.

The interruption of the flowing of exhaust gas through the EGR pipe 500 can be actuated by the ECU 450 by regulating the valve member 521 of the long route EGR valve 520 so that only fresh air is supplied to the ICE 110. During operation of the ICE 110, the ECU 450 continuously determines the values $A_1$ and $A_2$ and it prevents the usage of the Long route EGR until the determined values $A_1$ and $A_2$ are equal or greater than the respective values $A_{1 baseline}$ and $A_{2 baseline}$.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating an internal combustion engine having a turbocharger and an exhaust gas recirculation pipe fluidly connecting an exhaust system to an air intake system, the method comprising:
    sampling over time a first value of a parameter indicative of the density of a mixture of fresh air and exhaust gas in the air intake system;
    computing a frequency spectrum of the sampled first values;
    integrating the frequency spectrum over a predetermined frequency range to determine a first fluid density value; and
    interrupting a flowing of exhaust gas through the exhaust gas recirculation pipe if the first fluid density value is lower than a first reference value thereof.

2. The method according to claim 1, further comprising:
    sampling over time a second value of the parameter indicative of the density of the mixture of fresh air and exhaust gas in the air intake system;
    computing a second frequency spectrum of the sampled second values;
    integrating the second frequency spectrum over the predetermined frequency range to determine a second fluid density value; and
    interrupting a flowing of exhaust gas through the exhaust gas recirculation pipe if the second fluid density value is lower than a second reference value thereof.

3. The method according to claim 2, wherein the step of monitoring the first and the second value comprises sampling over time pressure values of the mixture of fresh air and exhaust gas, performing a fast Fourier transform of the sampled pressure values and integrating the fast Fourier transform in the predetermined range of frequency.

4. A non-transitory computer-readable medium comprising a computer program including program code, which when executed on a computer, is configured to:
- sample over time a first value of a parameter indicative of the density of a mixture of fresh air and exhaust gas in the air intake system;
- compute a frequency spectrum the sampled first values;
- integrate the frequency spectrum in a predetermined range of frequency for determining a first fluid density value; and
- interrupt a flowing of exhaust gas through the exhaust gas recirculation pipe if the first fluid density value is lower than a first reference value thereof.

5. An internal combustion engine comprising a turbocharger and an exhaust gas recirculation pipe fluidly connecting an exhaust system to an air intake system, and an electronic control unit configured to:
- sample over time a first value of a parameter indicative of the density of a mixture of fresh air and exhaust gas in the air intake system,
- compute a frequency spectrum the sampled first values;
- integrate the frequency spectrum in a predetermined range of frequency for determining a first fluid density value; and
- interrupt a flowing of exhaust gas through the exhaust gas recirculation pipe if the first fluid density value is lower than a first reference value thereof.

6. The internal combustion engine according to claim 5, wherein the electronic control unit is further configured to:
- sample over time a second value of the parameter indicative of the density of the mixture of fresh air and exhaust gas in the air intake system,
- compute a second frequency spectrum of the sampled second values;
- integrate the second frequency spectrum over the predetermined frequency range to determine a second fluid density value; and
- interrupt a flowing of exhaust gas through the exhaust gas recirculation pipe if the second fluid density value is lower than a second reference value thereof.

7. The internal combustion engine according to claim 6, wherein the electronic control unit is further configured to sample over time pressure values of the mixture of fresh air and exhaust gas, performing a fast Fourier transform of the sampled pressure values and integrating the fast Fourier transform in the predetermined range of frequency.

8. The method according to claim 1, wherein the first predetermined frequency range is between 2.5 kHz and 3.5 kHz.

9. The method according to claim 1, further comprising performing a fast Fourier transform of the sampled first values to compute the frequency spectrum thereof.

10. The method according to claim 1, wherein the parameter indicative of the density of a mixture of fresh air and exhaust gas in the air intake system comprises a fluid pressure in the air intake system downstream of the an exhaust gas recirculation pipe such that the sampled values comprise sampled pressure values.

11. The method according to claim 1, further comprising:
- integrating the frequency spectrum over a second predetermined frequency range to determine a second fluid density value; and
- interrupting a flowing of exhaust gas through the exhaust gas recirculation pipe if the second fluid density value is lower than a second reference value thereof.

12. The method according to claim 11, wherein the first predetermined frequency range is between 2.5 kHz and 3.5 kHz and the second predetermined frequency range is between 4.5 kHz and 5 kHz.

13. The method according to claim 11, further comprising performing a fast Fourier transform of the sampled second values to compute the frequency spectrum thereof.

14. The method according to claim 3, further comprising performing a fast Fourier transform of the sampled second values to compute the frequency spectrum thereof.

15. The method according to claim 1 further comprising updating the first reference value based on the first fluid density value for a known engine operating condition.

* * * * *